US008715531B2

(12) United States Patent
Qian et al.

(10) Patent No.: US 8,715,531 B2
(45) Date of Patent: May 6, 2014

(54) ACTUATOR

(75) Inventors: Pu Qian, Wako (JP); Kazuhiro Kagawa, Wako (JP); Akihisa Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 12/412,165

(22) Filed: Mar. 26, 2009

(65) Prior Publication Data

US 2009/0242848 A1 Oct. 1, 2009

(30) Foreign Application Priority Data

Mar. 26, 2008 (JP) ................................ 2008-079678

(51) Int. Cl.

| | |
|---|---|
| ***H01B 1/00*** | (2006.01) |
| ***H01B 1/12*** | (2006.01) |
| ***C08K 5/15*** | (2006.01) |
| ***C08K 5/1535*** | (2006.01) |

(52) U.S. Cl.

USPC ................ 252/500; 524/86; 524/82; 524/84; 524/94; 524/104; 524/107; 310/336; 310/365; 310/311

(58) Field of Classification Search

USPC .......... 252/500; 524/82, 84, 86, 94, 104, 107, 524/111

See application file for complete search history.

(56) References Cited

U.S. PATENT DOCUMENTS

| | | | | |
|---|---|---|---|---|
| 6,008,265 | A * | 12/1999 | Vallee et al. | 522/25 |
| 7,837,902 | B2 * | 11/2010 | Hsu et al. | 252/500 |
| 2006/0076540 | A1 * | 4/2006 | Zama et al. | 252/500 |
| 2006/0169954 | A1 * | 8/2006 | Smela et al. | 252/500 |
| 2007/0216262 | A1 * | 9/2007 | Hattori et al. | 310/365 |
| 2007/0254216 | A1 * | 11/2007 | Hara et al. | 429/339 |
| 2008/0139710 | A1 * | 6/2008 | Tsukada et al. | 524/100 |
| 2009/0256117 | A1 * | 10/2009 | Seshadri et al. | 252/500 |
| 2010/0288635 | A1 * | 11/2010 | Komiya et al. | 204/406 |

FOREIGN PATENT DOCUMENTS

| | | | | |
|---|---|---|---|---|
| JP | 2000336154 A | * | 12/2000 | C08G 81/12 |
| JP | 2004-162035 | | 6/2004 | |
| JP | 2006054951 A | * | 2/2006 | H02N 11/00 |
| JP | 2006066549 A | * | 3/2006 | H01G 9/058 |
| WO | WO 2006/049074 | * | 5/2006 | H01B 1/12 |

* cited by examiner

*Primary Examiner* — Peter F Godenschwager
*Assistant Examiner* — Jane L Stanley
(74) *Attorney, Agent, or Firm* — Nelson Mullins Riley & Scarborough LLP; Anthony A. Laurentano

(57) ABSTRACT

A conductive polymer doped with a dopant can be expanded and contracted when electrically oxidized and reduced in a driving electrolytic solution containing an anion, and thereby can act as an actuator element in an actuator. The anion is a fluorine-containing ion derived from a strong acid, and the dopant is an aromatic sulfonate ion free of fluorine. The conductive polymer is a polymer containing a 5-membered heterocyclic moiety as a repeating unit, such as a polypyrrole or a polythiophene. When the conductive polymer is in an oxidized state, at least part of the 5-membered heterocyclic moieties has a carbonyl group.

9 Claims, 11 Drawing Sheets

ACTUATOR

BACKGROUND OF THE INVENTION

1. Field of the Invention

The present invention relates to an actuator containing a conductive polymer that acts as an actuator element.

2. Description of the Related Art

A conductive polymer doped with a dopant (a dopant-containing conductive polymer) such as a polypyrrole doped with a dopant can be expanded and contracted when electrochemically oxidized and reduced. In view of the electrolytic expansion/contraction properties, actuators using a thin film of the dopant-containing conductive polymer as an actuator element have been studied as described in Japanese Laid-Open Patent Publication No. 2004-162035. For example, when the dopant-containing conductive polymer (the actuator element) is immersed in an electrolytic solution and a voltage is applied thereto, ions in the electrolytic solution are introduced into the actuator element, whereby the actuator element is expanded. When a voltage is applied in the reverse direction, the introduced ions are released from the actuator element, whereby the actuator element is contracted.

This type of actuator element (in other words, the thin film of the dopant-containing conductive polymer) can be produced by adding the dopant and a monomer to a solvent and by applying an appropriate voltage through a pair of electrodes immersed in the solvent. In this case, an electrolytic oxidative polymerization occurs, so that the thin film of the dopant-containing conductive polymer is deposited on a surface of the positive electrode.

It is obviously preferred that the actuator element has a high expansion/contraction ratio. From this viewpoint, in Japanese Laid-Open Patent Publication No. 2004-162035, a trifluoromethanesulfonate ion and/or an anion that contains a plurality of fluorine atoms capable of bonding to a central atom, is used as the dopant while a positive electrode is made of metal, to obtain the dopant-containing conductive polymer with a high expansion/contraction ratio.

In specific examples (Examples 1 to 17) of Japanese Laid-Open Patent Publication No. 2004-162035, a polypyrrole doped with a dopant of a tetrafluoroborate ion or a trifluorosulfonate ion is used as an actuator element, and the actuator element is immersed in a 15%-by-weight aqueous solution of sodium hexafluorophosphate to produce an actuator. Paragraphs [0074] and [0076] of Japanese Laid-Open Patent Publication No. 2004-162035 reports that, while a polypyrrole doped with a benzenesulfonate ion or a p-toluenesulfonate ion had an expansion/contraction ratio of less than 3%, the actuator elements of Examples 1 to 17 each had an expansion/contraction ratio of 3% to 5% under 1-cycle potential application.

As a result of intense research, the inventors of the present application have found that, though the expansion/contraction ratios of the actuator elements of Examples 1 to 17 according to Japanese Laid-Open Patent Publication No. 2004-162035 are 3% or more in the first cycle, the ratios are rapidly lowered in the second cycle or later. Thus, the actuator element of Japanese Laid-Open Patent Publication No. 2004-162035 is poor in durability, and thereby is significantly disadvantageous in difficulty of maintaining the expansion/contraction ratio.

SUMMARY OF THE INVENTION

A principal object of the present invention is to provide an actuator containing an actuator element having a high expansion/contraction ratio.

Another object of the present invention is to provide an actuator containing an actuator element capable of maintaining a high expansion/contraction ratio.

According to an aspect of the present invention, there is provided an actuator comprising an actuator element containing a conductive polymer doped with a dopant, the conductive polymer being expanded and contracted when electrically oxidized and reduced in a driving electrolytic solution containing an anion, wherein the anion is a fluorine-containing ion derived from a strong acid, the dopant is an aromatic sulfonate ion free of fluorine, the conductive polymer contains a 5-membered heterocyclic moiety as a repeating unit, and at least part of the 5-membered heterocyclic moieties has a carbonyl group when the conductive polymer is in an oxidized state.

The fluorine-containing ion derived from the strong acid has a relatively large ionic radius. When the conductive polymer containing the dopant is electrically oxidized or reduced, such a large ion is introduced thereto or released therefrom, so that the conductive polymer is largely expanded and contracted.

On the other hand, the fluorine-containing ion derived from the strong acid is capable of decomposing the conductive polymer. However, in the present invention, the fluorine-free aromatic sulfonate ion is introduced as the dopant into the conductive polymer. This type of aromatic sulfonate ion has a relatively small ionic radius, and therefore the conductive polymer doped therewith has a dense polymer chain. As a result, the contact area between the conductive polymer and the strong acid ion is decreased, and accordingly, it becomes difficult to decompose the conductive polymer. Thus, the actuator element is excellent in durability.

Furthermore, in the present invention, at least part of the repeating unit moieties of the conductive polymer has a carbonyl group as described above. Due to the presence of the carbonyl group, a conjugate structure of the polymer chain in the conductive polymer can be maintained even in the case of repeatedly oxidizing and reducing the conductive polymer. This also contributes to the excellent durability of the actuator element.

As described above, the actuator element according to the present invention can maintain an excellent expansion/contraction ratio even in the case of repeating the oxidation and reduction. In other words, the actuator of the present invention contains the actuator element having a high expansion/contraction ratio and an excellent durability.

For example, it is preferred that the anion is a perfluoromethanesulfonylimide ion, the dopant is a benzenesulfonate ion or a p-toluenesulfonate ion, and the conductive polymer is a polymer containing a pyrrole moiety as a repeating unit or a derivative thereof.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic structural view showing a vertical cross section of an actuator according to an embodiment. In the actuator 10, an actuator element 16 is immersed in a driving electrolytic solution (hereinafter referred to as an electrolytic solution) 14 contained in a vessel 12.

Figure 1:
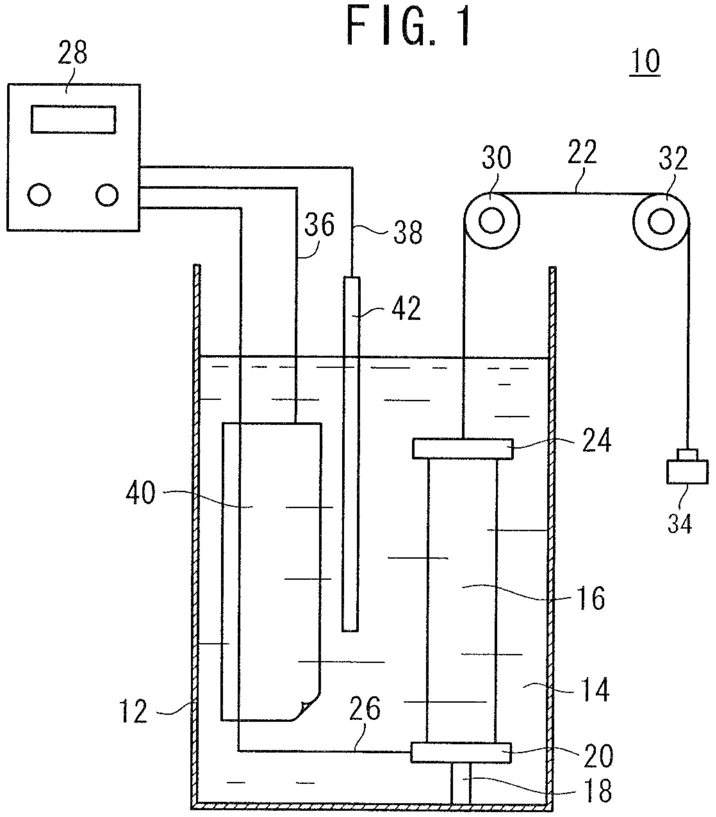
FIG. 1 is a schematic structural view showing a vertical cross section of an actuator according to an embodiment of the present invention.

In the vessel 12, a lower clamp 20 is supported by a support member 18 disposed on the bottom wall, and an upper clamp 24 is hung on a wire 22. The actuator element 16 is expandably and contractibly held between the lower clamp 20 and the upper clamp 24. The lower clamp 20 is composed of a conductive material, and is electrically connected to a potentiostat 28 by a lead wire 26.

The actuator element 16 contains a conductive polymer doped with a dopant, i.e. a dopant-containing conductive polymer.

The conductive polymer, which acts as a host, has a 5-membered heterocyclic moiety as a repeating unit. When the conductive polymer is in an oxidized state where an anion (to be described later) in the electrolytic solution 14 is introduced into the conductive polymer, at least part of the 5-membered heterocyclic moieties has a carbonyl group. Thus, the conductive polymer may be expressed by the following general structural formula (1). In the general formula (1), each portion marked with a black circle (•) is a radical portion, and each portion marked with a plus sign (+) is a positively-charged portion. Each A is an anion and each portion marked with a minus sign (−) is a negatively-charged portion. The dashed line represents that π electrons are delocalized in the conjugate structure. Also the signs shown in the following formulae have the same meanings.

(1)

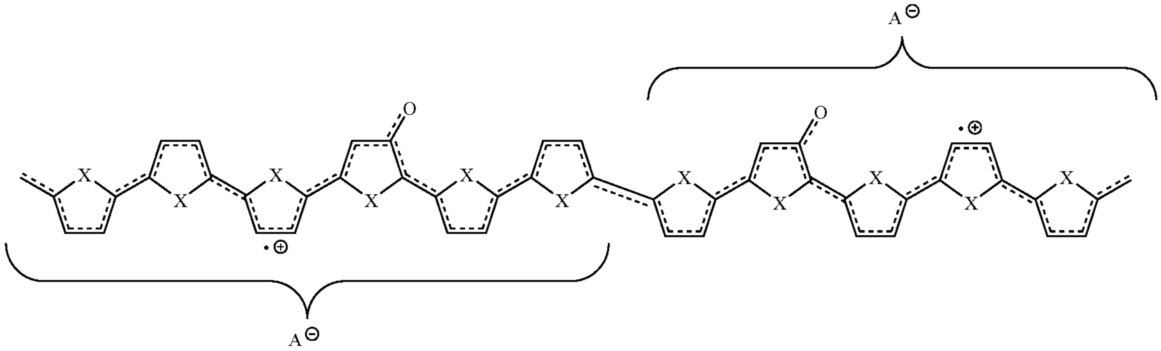

X = NH, S, O, Se, etc.

Figure 9:
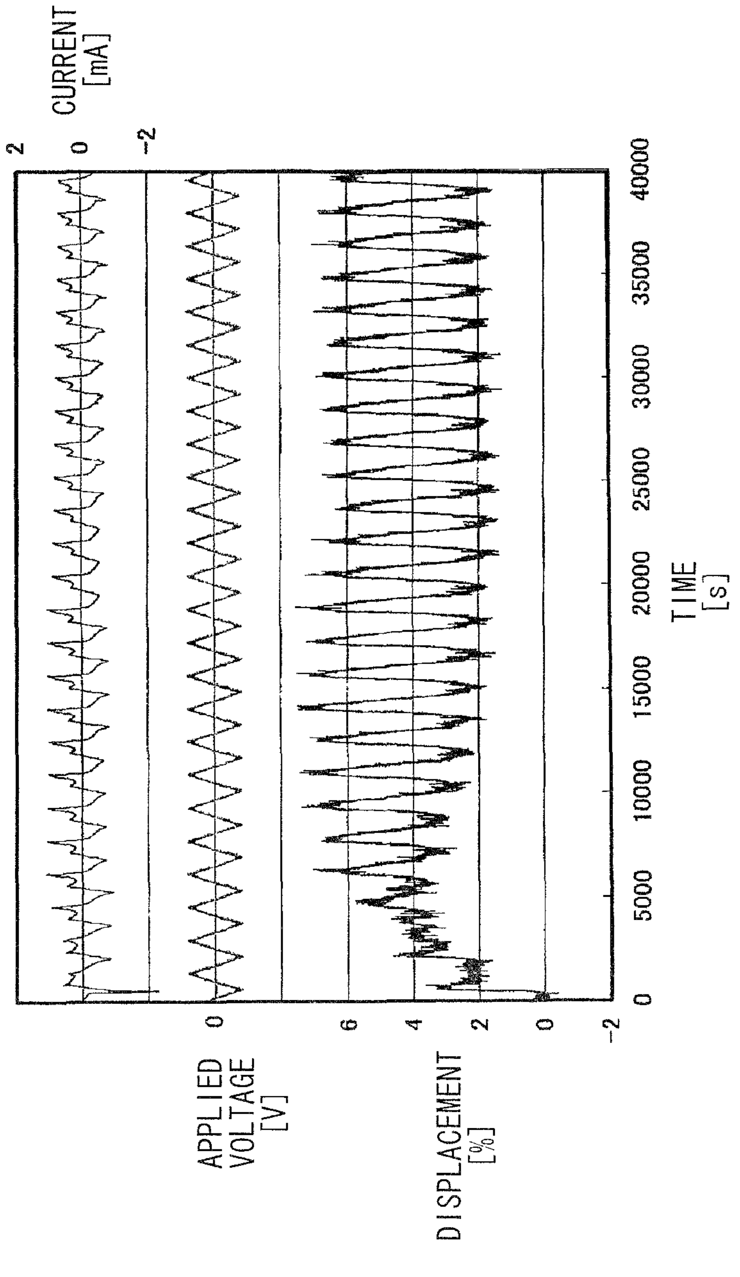
Figure 10:
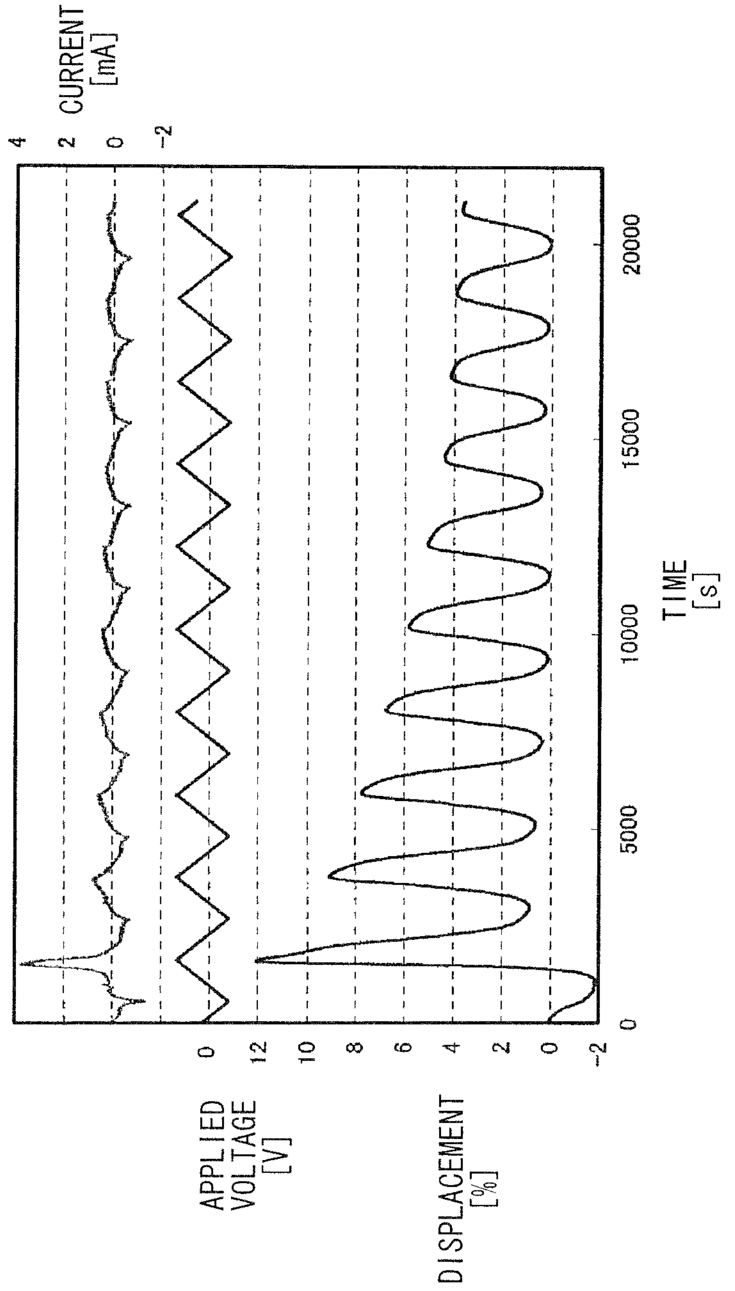
Figure 11:
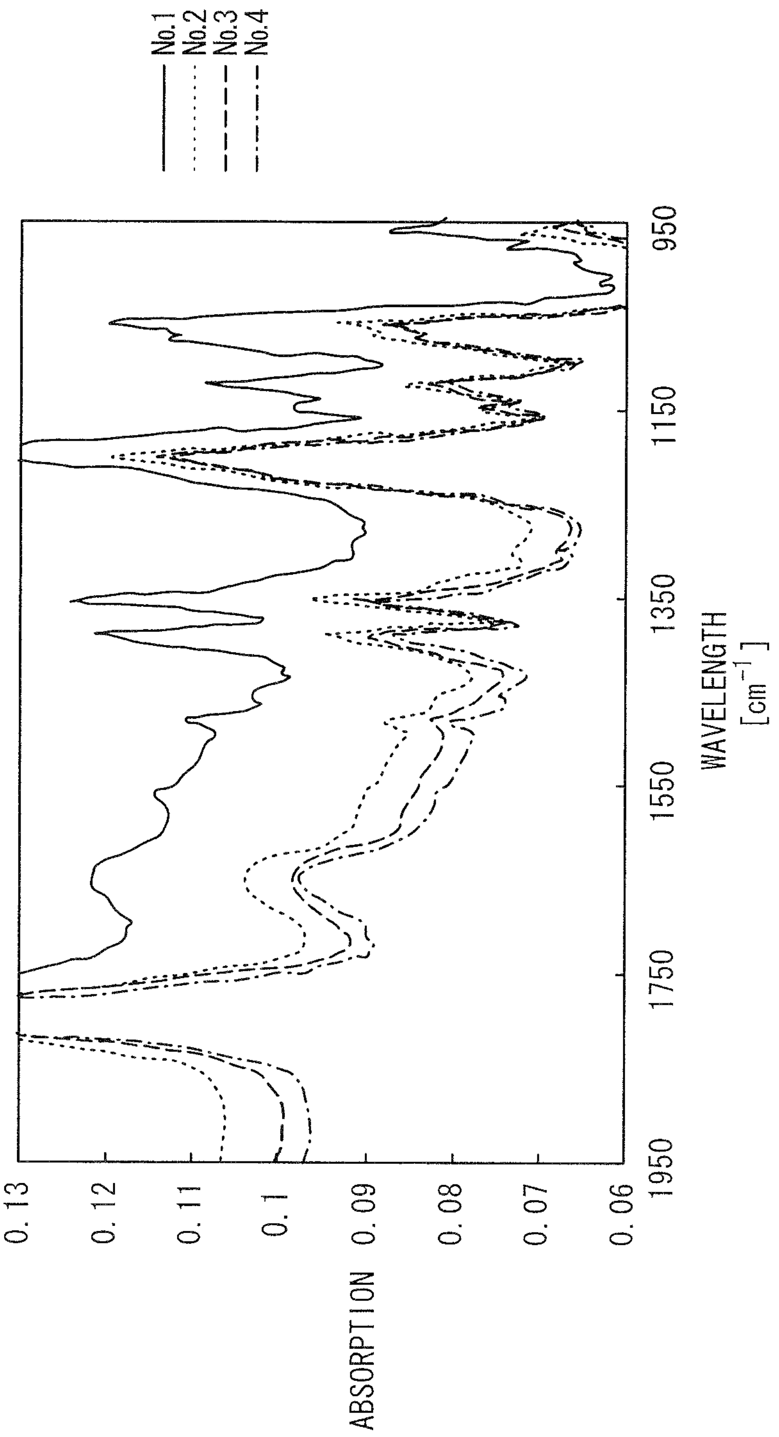

FIG. 9 is a graph showing changes in an expansion/contraction ratio, a sweep voltage, and a current of an actuator element of Example 4, in repeated sweep cycles;

FIG. 10 is a graph showing changes in an expansion/contraction ratio, a sweep voltage, and a current of an actuator element of Comparative Example 1, in repeated sweep cycles; and FIG. 11 is a graph showing an infrared absorption spectrum change of an actuator element of Comparative Example 2, in repeated sweep cycles.

DESCRIPTION OF THE PREFERRED EMBODIMENTS

Preferred embodiments of an actuator of the present invention will be described in detail below with reference to accompanying drawings.

In the general formula (1), preferred examples of X include NH, S, O, and Se. Particularly in a case where X is NH, and thus the conductive polymer has a pyrrole moiety as the repeating unit, the actuator element 16 preferably has a high expansion/contraction ratio and an excellent durability.

In the conductive polymer, a hydrogen atom of the 5-membered heterocyclic moiety may be substituted by an alkyl group or an oxyalkyl group.

When the conductive polymer is in a reduced state where the introduced anion is released, the carbonyl group is converted to a hydroxyl group. Thus, the conductive polymer in the reduced state may be expressed by the following general structural formula (2).

(2)

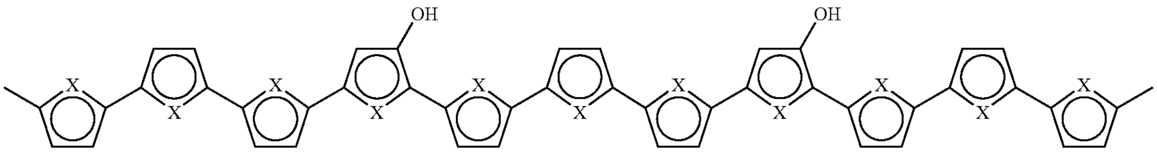

For example, in the case where X is NH, the conductive polymer is a polypyrrole-based compound, and the oxidized state and the reduced state are represented by the following structural formulae (3) and (4) respectively.

(3)

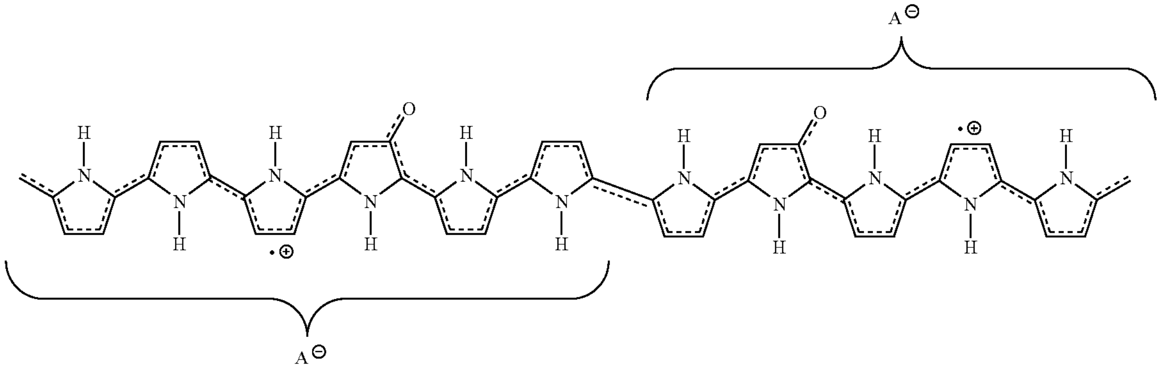

(4)

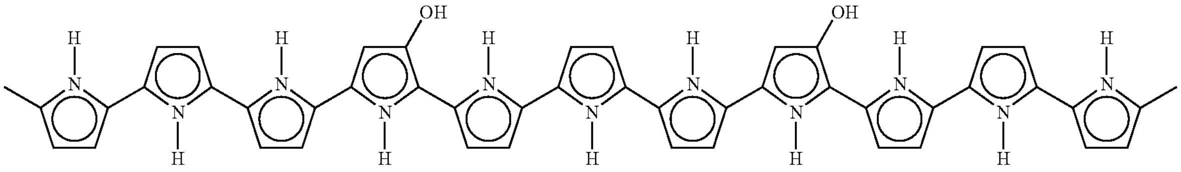

In a case where X is S, the conductive polymer is a polythiophene-based compound, and the oxidized state and the reduced state are represented by the following structural formulae (5) and (6) respectively.

(5)

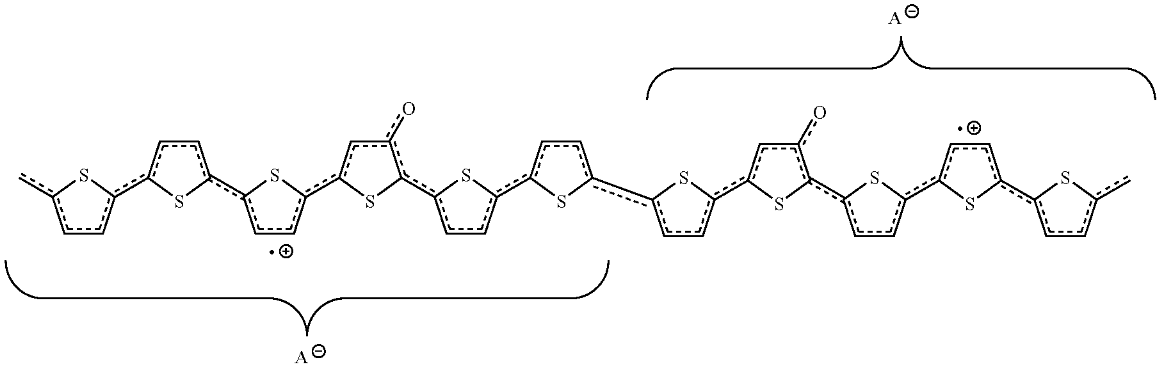

(6)

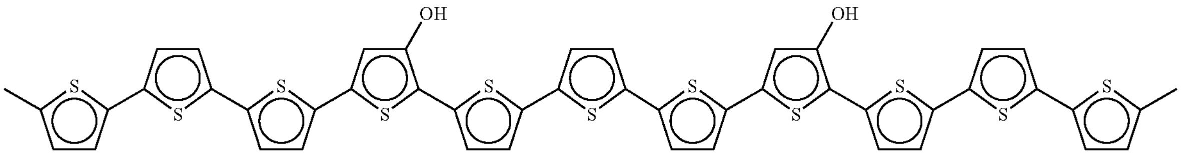

An aromatic sulfonate ion free of fluorine is selected as a dopant, with which the above conductive polymer is doped. Specific examples of such ions include a benzenesulfonate ion, a p-toluenesulfonate ion, a p-ethylbenzenesulfonate ion, and an m-xylenesulfonate ion, represented by the following structural formulae (7) to (10) respectively. Among them, the benzenesulfonate ion or the p-toluenesulfonate ion is preferred. In this case, this is because the actuator element 16 can have a high expansion/contraction ratio and an excellent durability.

(7)

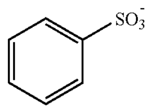

(8)

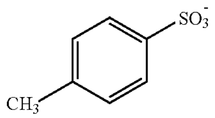

(9)

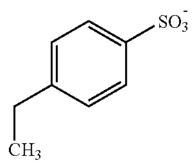

(10)

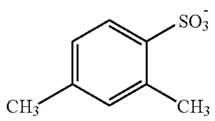

The electrolytic solution 14, in which the actuator element 16 is immersed, contains the anion indicated as $A^-$ in the general formula (1) and the structural formulae (3) and (5). In this embodiment, the anion is a fluorine-containing ion derived from a strong acid.

Specific examples of such anions include a perfluoromethanesulfonylimide ion $(CF_3SO_2)_2N^-$ and a trifluoromethanesulfonate ion $CF_3SO_3^-$. The anion may have a structure containing a central atom and a plurality of fluorine atoms bonded thereto. Specific examples of this type of anions include a tetrafluoroborate ion $BF_4^-$, a hexafluorophosphate ion $PF_6^-$, a hexafluoroantimonate ion $SbF_6^-$, and a hexafluoroarsenate ion $AsF_6^-$. Among them, the perfluoromethanesulfonylimide ion is particularly preferred. In this case, it is because the actuator element 16 can have a high expansion/contraction ratio and an excellent durability.

The wire 22 connected to the upper clamp 24 extends vertically upward, and turns around a first pulley 30 and a second pulley 32 and extends vertically downward. A weight 34, if necessary, may be attached to the end of the wire 22 hung from the second pulley 32. The wire 22 is pulled by the weight 34, and thus the actuator element 16 is pulled vertically upward by the upper clamp 24.

A counter electrode 40 and a reference electrode 42 are electrically connected to the potentiostat 28 by lead wires 36, 38, and are immersed in the electrolytic solution 14 to form the actuator 10.

The above actuator element 16 has a remarkably high expansion/contraction ratio of 5% to 10%, and can maintain the high ratio. Thus, in the actuator 10, the actuator element 16 can have a high expansion/contraction ratio and an excellent durability.

The actuator 10 may be produced as follows.

Figure 2:
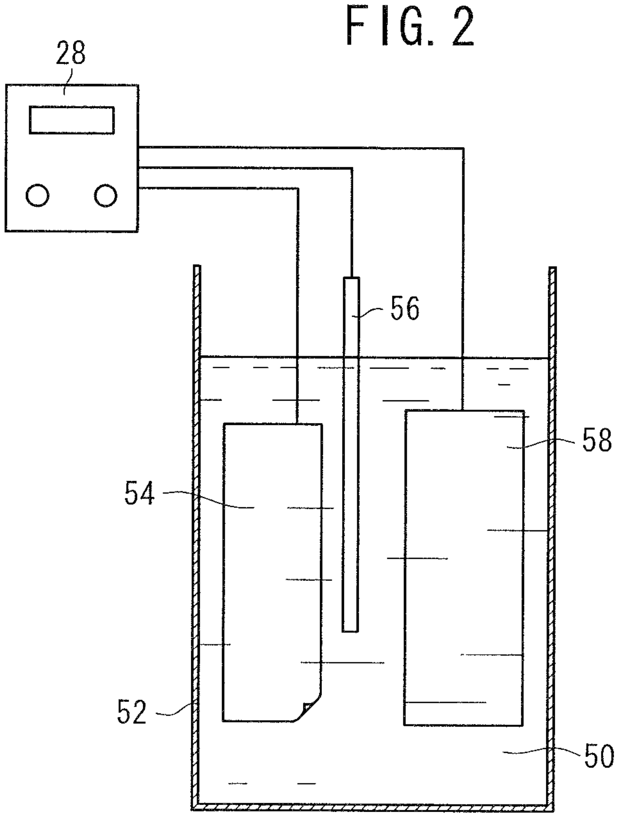
FIG. 2 is a schematic structural view showing a vertical cross section of a polymerization apparatus for producing an actuator element shown in FIG. 1.

First, a 5-membered heterocyclic compound for forming the 5-membered heterocyclic moiety and a salt for generating the anion are added to a solvent to prepare a polymerization solution 50 (see FIG. 2). Obviously, as such a 5-membered heterocyclic compound, a structure of pyrrole, thiophene, etc. is selected, and as such a salt, the salt that generates the fluorine-free aromatic sulfonate ion is selected. The solvent is preferably water, though it is not limited as long as both of the 5-membered heterocyclic compound and the salt can be dissolved therein. The concentration of each of the 5-membered heterocyclic compound and the salt is preferably 0.005 to 2 mol/l.

As shown in FIG. 2, the polymerization solution 50 is placed in a vessel 52. A counter electrode 54, a reference electrode 56, and a working electrode 58 are electrically connected to a potentiostat 28, and immersed in the polymerization solution 50.

Then, a voltage of 0.6 to 1.2 V with reference to the reference electrode 56 is applied to the working electrode 58 for 3 to 60 minutes. By this process, a thin film of the conductive polymer doped with the dopant of the fluorine-free aromatic sulfonate ion (anion), i.e. the dopant-containing conductive polymer, is deposited on a surface of the working electrode 58. Obviously, the conductive polymer has the repeating unit derived from the 5-membered heterocyclic compound added to the polymerization solution 50, and thus is specifically a polypyrrole, a polythiophene, a derivative thereof, etc.

The thin film is peeled from the working electrode 58, placed into the vessel 12 shown in FIG. 1, and held by the lower clamp 20 and the upper clamp 24. Then, as shown in FIG. 1, the electrolytic solution 14 is added to the vessel 12, and the reference electrode 42 and the counter electrode 40 are immersed therein, to obtain the actuator 10.

A sweep cycle between −0.8 to 0.8 V potential may be repeated 2 to 5 times. In this process, the weight 34 may be attached to the wire 22 if necessary. In this case, a load is applied to the conductive polymer, whereby the thin film is prevented from bending due to the expansion and contraction. The weight 34 is set such that an excess load is not applied to the thin film.

In such sweep cycles, the carbonyl group is bonded to part of the repeating unit moieties in the conductive polymer. Thus, the actuator element 16 having a high expansion/contraction ratio of 5% to 10% is obtained. This structure, as it is, can be used as the actuator 10.

Example 1

Pyrrole and p-toluenesulfonate sodium salt were dissolved in pure water at concentrations of 0.3 and 0.2 mol/l respectively, to prepare a polymerization solution. A working electrode of a stainless steel (30 mm×45 mm), a counter electrode of a nickel mesh (50 mm×100 mm), and a reference electrode of Ag/AgCl were electrically connected to a potentiostat, and immersed in the polymerization solution.

The working electrode and the reference electrode were left at the room temperature (20° C.) for 25 minutes while a voltage of 0.8 V with reference to the reference electrode is applied to the working electrode. The pyrrole was polymerized, so that a 50-μm-thick thin film of a polypyrrole doped with a p-toluenesulfonate ion was deposited on the entire surface of the working electrode.

The thin film was peeled from the working electrode, and cut into a length of 12 mm and a width of 5 mm. Then, as shown in FIG. 1, the thin film was held by a lower clamp 20 and an upper clamp 24, and was immersed in an electrolytic solution 14 of a 0.5-mol/l aqueous solution of a perfluoromethanesulfonylimide lithium salt contained in a vessel 12. A weight 34 was attached to the end of a wire 22 connected to the upper clamp 24 such that a stress of 0.5 MPa was applied to the thin film.

After the lower clamp 20 was electrically connected to a potentiostat 28, a counter electrode 40 of platinum (45 mm×60 mm) and a reference electrode 42 of Ag/AgCl were immersed in the electrolytic solution 14 and electrically connected to the potentiostat 28.

A sweep cycle for the reference electrode 42 was repeated plural times between −0.8 to 0.8 V at a sweep speed of 2 mV/second. In the sweep cycles, the displacement of the thin film was measured by a laser displacement meter, and the expansion/contraction ratio was determined based on the initial length. Further, changes in the sweep voltage and the current were measured. The results of the first to fifth cycles are shown in FIG. 3.

Figure 3:
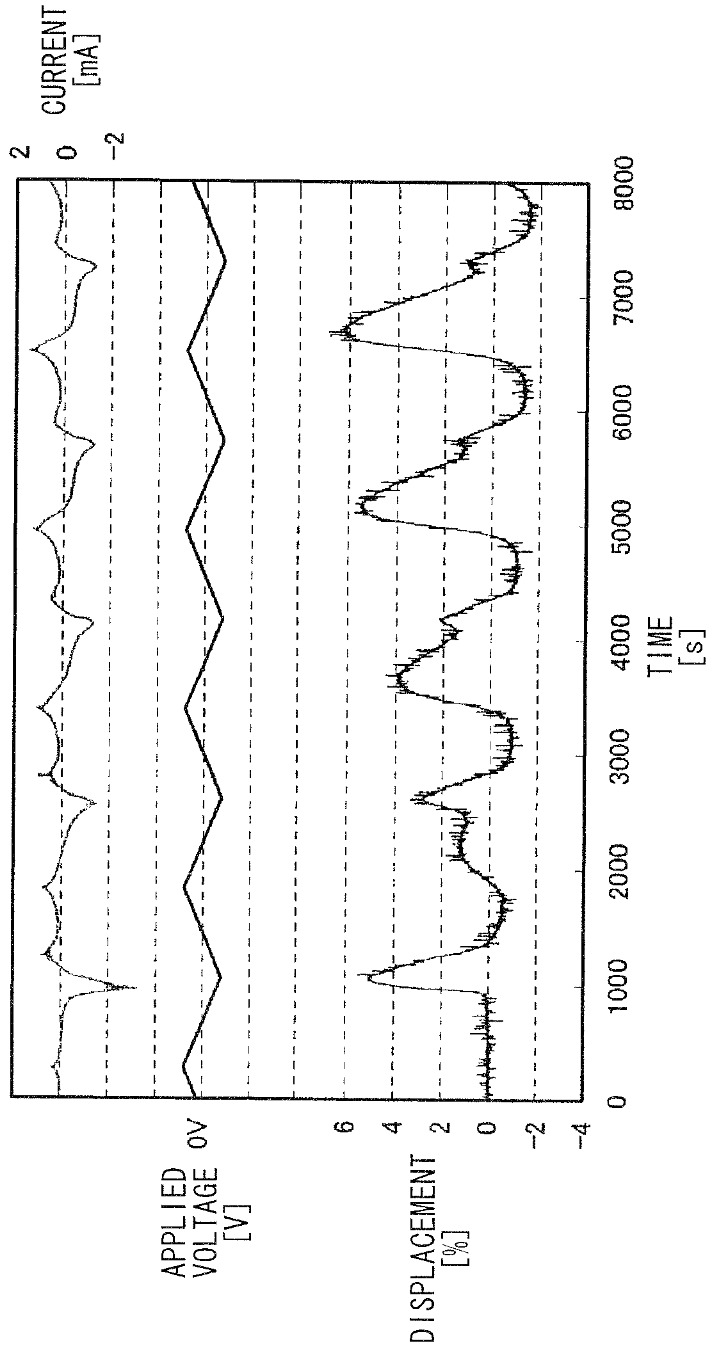
FIG. 3 is a graph showing changes in an expansion/contraction ratio, a sweep voltage, and a current of an actuator element of Example 1, in first to fifth sweep cycles.

As can be seen from FIG. 3, the expansion/contraction ratio was 5%, 5%, and 9% in the first, third, and fifth cycles respectively. Thus, the expansion/contraction ratio was remarkably increased by repeating the sweep cycle five times.

Figure 4:
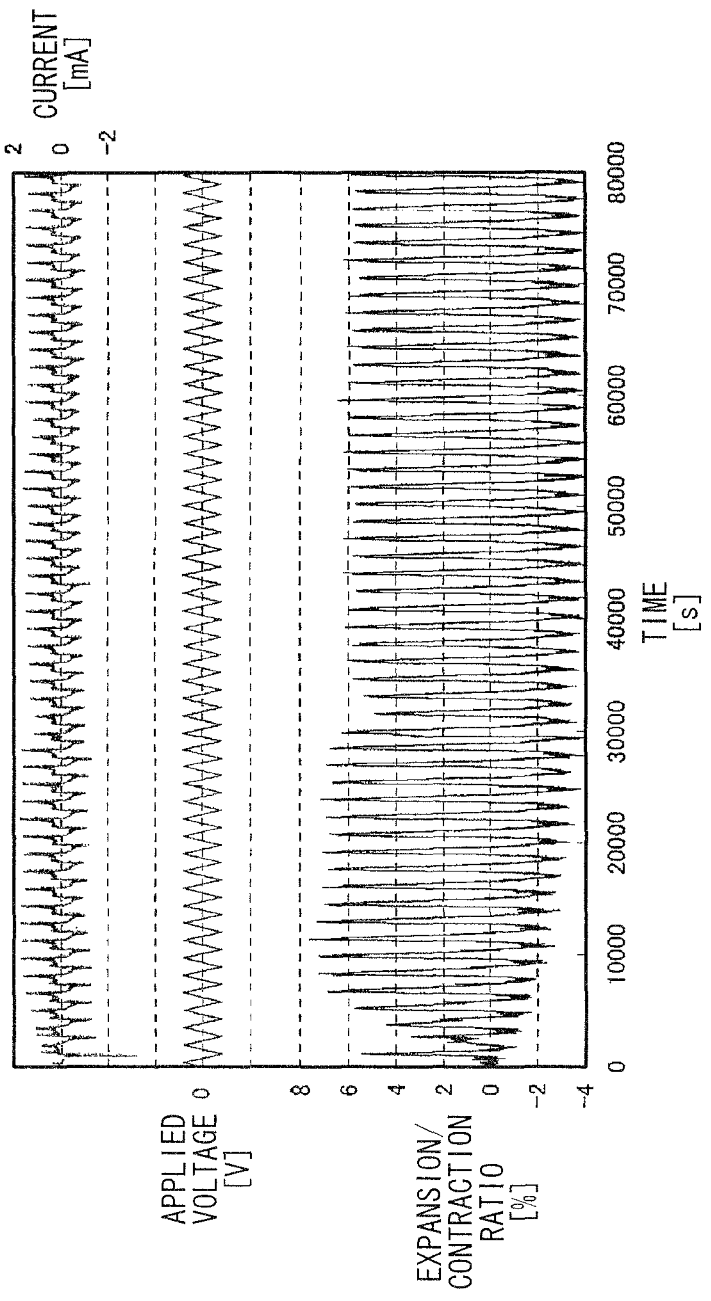
FIG. 4 is a graph showing changes in the expansion/contraction ratio, the sweep voltage, and the current of the actuator element of Example 1, in further repeated sweep cycles.

The sweep cycle was further repeated, and the expansion/contraction ratio was obtained. A change in the expansion/contraction ratio in the first to fifth cycles and the further cycles is shown in FIG. 4. As shown in FIG. 4, the thin film maintained an expansion/contraction ratio of 6% or more in the expansion direction (the positive direction) and an expansion/contraction ratio of 3% or more in the contraction direction (the negative direction), i.e., a total expansion/contraction ratio of approximately 9% or more, even in the sixth cycle or later. Thus, the thin film can maintain an excellent durability even in the case of repeating the oxidation and reduction.

Meanwhile, a structure change of the thin film in the repetition of the sweep cycle was examined by an ATR-SEIRA method, which is a combination of an attenuated total reflection (ATR) method and a surface-enhanced infrared absorption (SEIRA) method.

Figure 5:
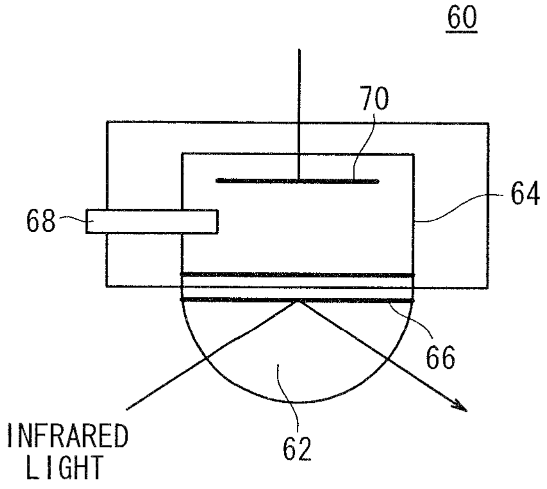
FIG. 5 is a schematic structural view showing an apparatus used in an ATR-SEIRA method.

FIG. 5 is a schematic structural view of an apparatus 60 used in the ATR-SEIRA method. The apparatus 60 has a prism 62 with a shape obtained by cutting a cylinder into half, a solution retaining cell 64 connected to the flat surface of the prism 62, a working electrode 66 formed as a gold plating on the flat surface, an Ag/AgCl reference electrode 68 partly inserted into the cell 64, and a platinum counter electrode 70 entirely inserted into the cell 64. An electrochemical reaction can be carried out in the solution retaining cell 64 by applying a potential between the working electrode 66 and the counter electrode 70.

When the apparatus 60 is irradiated with an infrared light capable of passing through the prism 62 during the electrochemical reaction, the infrared light is completely reflected at an interface of the working electrode 66. By measuring the infrared absorption spectrum of the reflected light, its change caused due to the electrochemical reaction occurring on the working electrode 66 can be examined by so-called in-situ observation.

Pyrrole and p-toluenesulfonate sodium salt were dissolved in pure water at concentrations of 0.3 and 0.2 mol/l respectively, to prepare a polymerization solution. The polymerization solution was introduced into the solution retaining cell 64. The working electrode 66, the reference electrode 68, and the counter electrode 70 were electrically connected to a potentiostat 28, and a voltage of 0.8 V with reference to the reference electrode 68 was applied to the working electrode 66 at the room temperature (20° C.) for 8 seconds. As a result, a polypyrrole doped with a p-toluenesulfonate ion was formed on the working electrode 66.

After discharging the polymerization solution from the solution retaining cell 64, the solution retaining cell 64 was washed with pure water, and a 0.5-mol/l aqueous solution of a perfluoromethanesulfonylimide lithium salt was introduced into the solution retaining cell 64. Then, a sweep cycle for the working electrode 66 was repeated nine times between −0.8 to 0.8 V with reference to the reference electrode 68 at a sweep speed of 2 mV/second. During the sweep cycles, the infrared absorption spectrum was measured at a potential of 0.8 V in each cycle, and an absorption spectrum change of the polypyrrole was observed.

Figure 6:
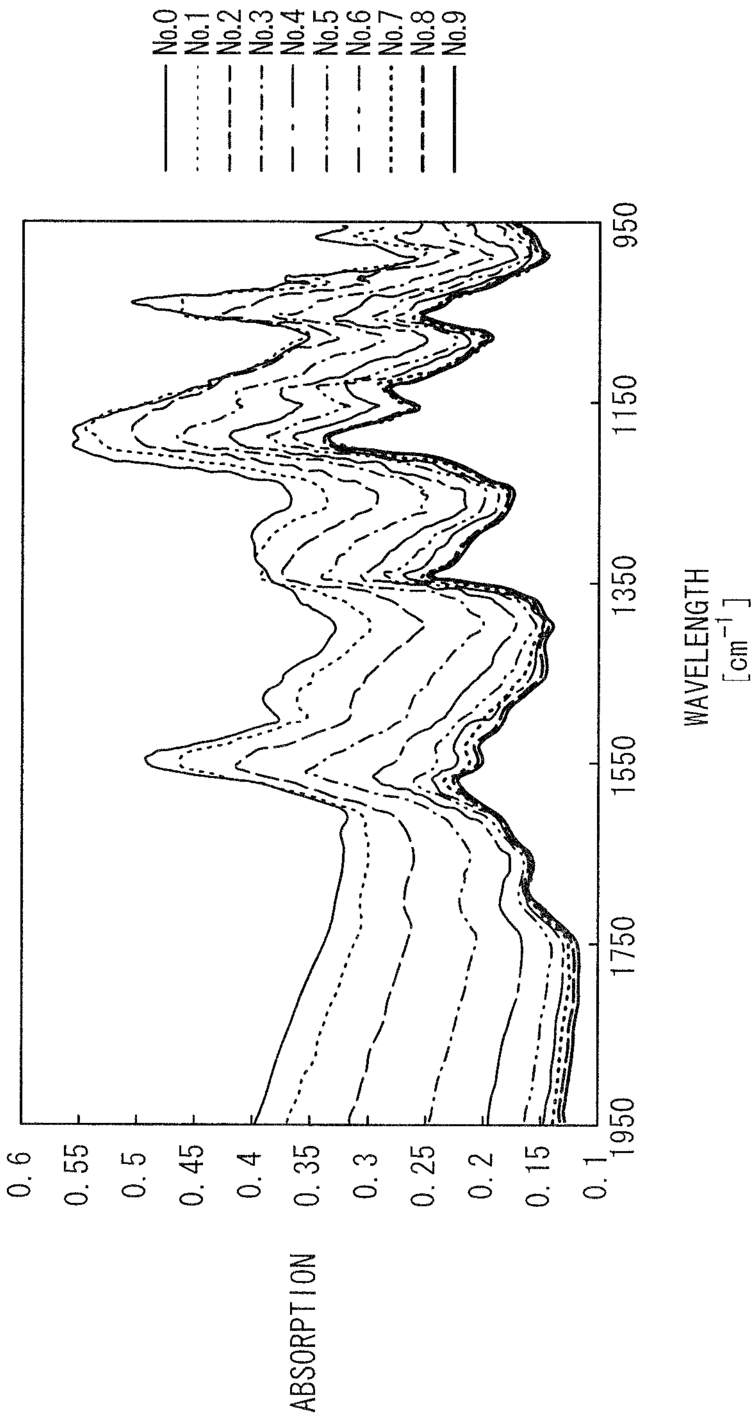
FIG. 6 is a graph showing a change in an infrared absorption spectrum of the actuator element of Example 1, in repeated sweep cycles.

The absorption spectra measured after each cycle and before the sweep cycle are shown in FIG. 6. In FIG. 6, the line of No. 0 is the absorption spectrum measured before the sweep cycle, and the lines of Nos. 1 to 9 are the absorption spectra measured after the first to ninth sweep cycles.

As can be seen from FIG. 6, an absorption peak derived from conjugated double bonds in the polypyrrole structure was exhibited at 1545 $cm^{-1}$ before the sweep cycle. This absorption peak remained at 1545 $cm^{-1}$ even after the first sweep cycle. It is clear from this that the polypyrrole was not changed by carrying out the sweep cycle only once.

In contrast, after the fifth sweep cycle, new peaks were exhibited at 1530 and 1700 $cm^{-1}$, while the absorption peak derived from the conjugated double bonds in the 5-membered heterocycles being shifted to 1572 $cm^{-1}$. The peak at 1700 $cm^{-1}$ is derived from a carbonyl group, and thus it is clear that the carbonyl group has been bonded to a 5-membered heterocyclic moiety (i.e., the repeating unit of the polypyrrole) after the fifth sweep cycle.

The absorption spectra measured after the sixth cycle or later were approximately equal to the absorption spectrum measured after the fifth cycle. It is clear from this that, by bonding the carbonyl group to the conductive polymer, the polymer chain of the conductive polymer can be prevented from decomposing even in the case of repeating the sweep cycle (the oxidation and reduction). As a result, the durability of the conductive polymer is considered to be improved.

Example 2

Pyrrole and benzenesulfonate sodium salt were dissolved in pure water each at a concentration of 0.2 mol/l, to prepare a polymerization solution. A 50-μm-thick thin film of a polypyrrole doped with a benzenesulfonate ion was deposited on the working electrode in the same manner as Example 1.

Figure 7:
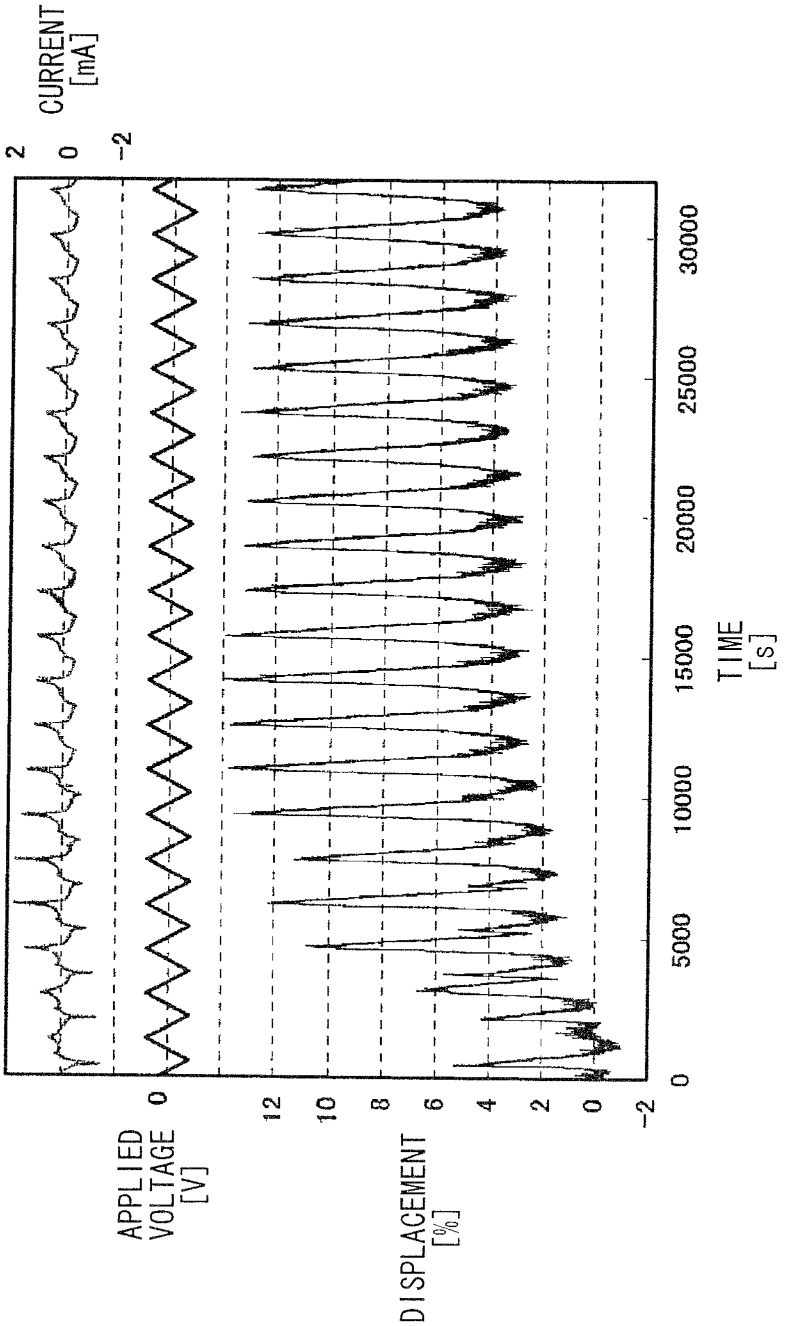
FIG. 7 is a graph showing changes in an expansion/contraction ratio, a sweep voltage, and a current of an actuator element of Example 2, in repeated sweep cycles.

The thin film was peeled from the working electrode, and cut into a length of 8.6 mm and a width of 5 mm. Then, a sweep cycle was repeated plural times in the same manner as Example 1. Changes in the expansion/contraction ratio, the sweep voltage, and the current of the thin film in the sweep cycles are shown in FIG. 7. As shown in FIG. 7, the expansion/contraction ratio was 10% in the fifth cycle, while it was 5% and 6% in the first and third cycles, respectively. Thus, the expansion/contraction ratio was remarkably increased by repeating the sweep cycle five times also in Example 2.

In addition, as can be seen from FIG. 7, the thin film maintained an expansion/contraction ratio of 12% or more even in the sixth cycle or later. Thus, the thin film also exhibits an excellent durability even in the case of repeating the oxidation and reduction.

Example 3

Pyrrole and p-ethylbenzenesulfonate sodium salt were dissolved in pure water each at a concentration of 0.2 mol/l, to prepare a polymerization solution. A 31-μm-thick thin film of a polypyrrole doped with a p-ethylbenzenesulfonate ion was deposited on the working electrode in the same manner as Examples 1 and 2.

Figure 8:
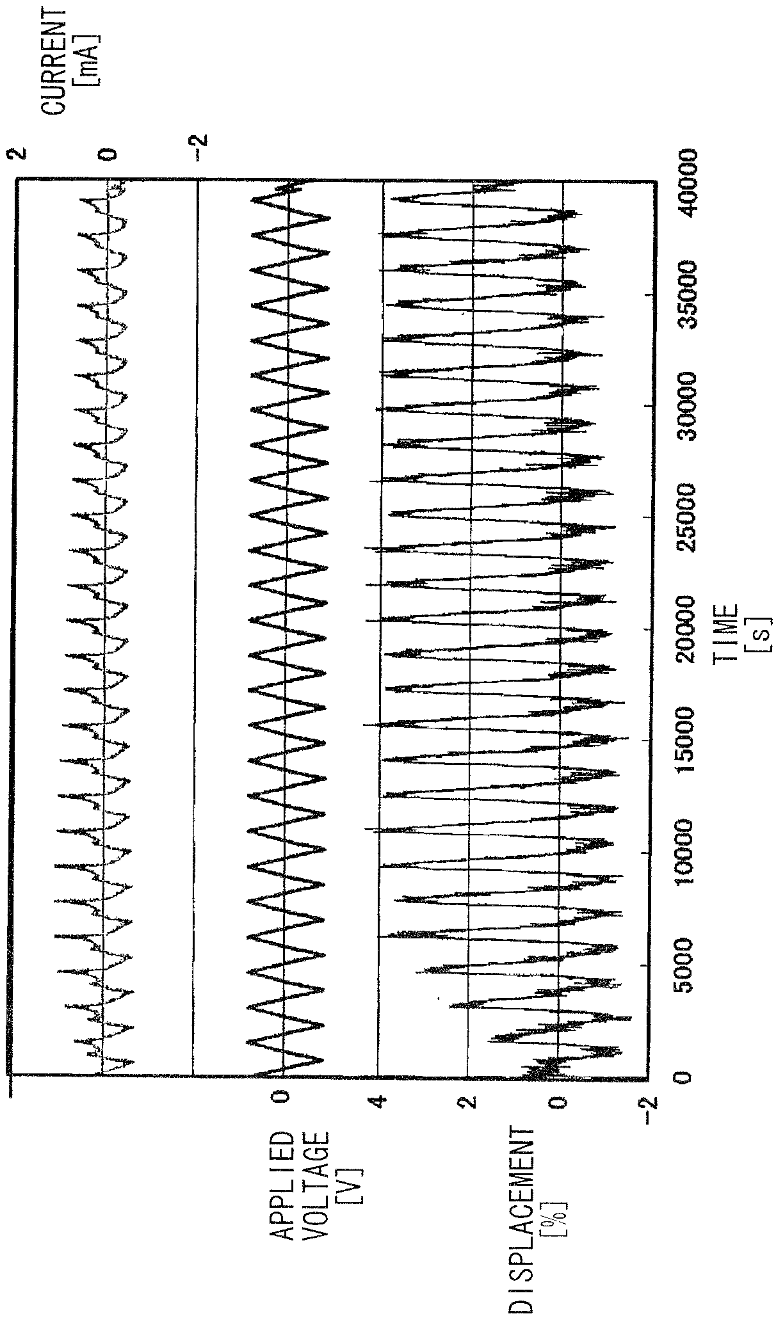
FIG. 8 is a graph showing changes in an expansion/contraction ratio, a sweep voltage, and a current of an actuator element of Example 3, in repeated sweep cycles.

The thin film was peeled from the working electrode, and cut into a length of 8.9 mm and a width of 5 mm. Then, a sweep cycle was repeated plural times in the same manner as Examples 1 and 2. Changes in the expansion/contraction ratio, the sweep voltage and the current of the thin film in the sweep cycles are shown in FIG. 8. As shown in FIG. 8, the expansion/contraction ratio was 5% in the fifth cycle, while it was 2% and 4% in the first and third cycles, respectively. Thus, the expansion/contraction ratio was increased by repeating the sweep cycle five times also in Example 3.

As can be seen from FIG. 8, the thin film maintained an expansion/contraction ratio of approximately 4% even in the sixth cycle or later. Thus, the thin film also exhibits an excellent durability even in the case of repeating the oxidation and reduction.

Example 4

Pyrrole and m-xylenesulfonate sodium salt were dissolved in pure water each at a concentration of 0.2 mol/l, to prepare a polymerization solution. A 27-μm-thick thin film of a polypyrrole doped with an m-xylenesulfonate ion was deposited on the working electrode in the same manner as Examples 1 to 3.

The thin film was peeled from the working electrode, and cut into a length of 8.3 mm and a width of 5 mm. Then, a sweep cycle was repeated plural times in the same manner as Examples 1 to 3. Changes in the expansion/contraction ratio, the sweep voltage and the current of the thin film in the sweep cycles are shown in FIG. 9. As shown in FIG. 9, the expansion/contraction ratio was 4% in the fifth cycle, while it was 2% in the first and third cycles. Thus, the expansion/contraction ratio was increased by repeating the sweep cycle five times also in Example 4.

In addition, as can be seen from FIG. 9, the thin film maintained an expansion/contraction ratio of more than 4% (approximately 2% to 6% in the positive direction) even in the sixth cycle or later. Thus, the thin film also exhibits an excellent durability even in the case of repeating the oxidation and reduction.

Comparative Example 1

Pyrrole and tetrafluoroborate tetrabutylammonium salt were dissolved in pure water at concentrations of 0.3 and 0.5 mol/l, respectively, to prepare a polymerization solution. The polymerization solution was placed in the same polymerization apparatus (see FIG. 2) as Examples 1 to 4, at the room temperature (20° C.) for 4 hours at a current density of 0.2 mA/cm$^2$, whereby a 20-μm-thick thin film of a polypyrrole doped with a tetrafluoroborate ion was deposited on the entire surface of the working electrode.

The thin film was peeled from the working electrode, and cut into a length of 14 mm and a width of 5 mm. Then, the same sweep cycle as Examples 1 to 4 was repeated ten times, the expansion/contraction ratio was determined, and changes in the sweep voltage and the current were examined. The results are shown in FIG. 10.

As can be seen from FIG. 10, though the expansion/contraction ratio was 14% in the first cycle, it was decreased with the increase of cycle number and was only 3.6% in the tenth cycle. Thus, the thin film was poor in durability.

Comparative Example 2

Pyrrole and a perfluoromethanesulfonylimide ion were dissolved in methyl benzoate each at a concentration of 0.2 mol/l, to prepare a polymerization solution 50. The polymerization solution was introduced into the solution retaining cell 64 of the apparatus 60 (see FIG. 5) for the ATR-SEIRA method, the working electrode 66, the reference electrode 68, and the counter electrode 70 were electrically connected to the potentiostat 28, and electricity was applied to the apparatus 60 at the room temperature (20° C.) for 90 seconds at a current density of 0.2 mA/cm$^2$, in the same manner as Example 1. As a result, a thin film of a polypyrrole doped with a perfluoromethanesulfonylimide ion was formed on the working electrode 66.

After discharging the polymerization solution from the solution retaining cell 64, a 0.5-mol/l solution of a perfluoromethanesulfonylimide lithium salt was introduced to the solution retaining cell 64. The solution was prepared by adding a 0.5-mol/l-perfluoromethanesulfonylimide lithium salt to a solvent prepared by mixing water and propylene carbonate at a volume ratio of 60:40. Then, a sweep cycle for the working electrode 66 was repeated four times between −0.9 to 0.7 V with reference to the reference electrode 68 at a sweep speed of 2 mV/second. During the sweep cycles, the infrared absorption spectrum was measured at a potential of 0.7 V in each cycle, and an absorption spectrum change of the polypyrrole was observed.

The absorption spectra measured after the cycles are shown in FIG. 11. In FIG. 11, the lines of Nos. 1 to 4 are the absorption spectra measured after the first to fourth sweep cycles.

In the absorption spectra, an absorption peak at approximately 1560 cm$^{-1}$ is derived from the conjugate structure of the polypyrrole in an oxidized state represented by the structural formula (3). It is clear from the comparison of Nos. 1 to 4 in FIG. 11 that this absorption peak was decreased with the increase of sweep cycle number. It is considered that this is because, when the sweep cycle (i.e. the oxidation and reduction) was repeated with reference to the polypyrrole doped with the perfluoromethanesulfonylimide ion derived from a strong acid, a fluorine ion derived from the perfluoromethanesulfonylimide ion was bonded to an aromatic double bond in the pyrrole ring by an addition reaction, thereby to form a structure represented by the following structural formula (11), whereby the conjugate structure in the oxidized state was disappeared.

(11)

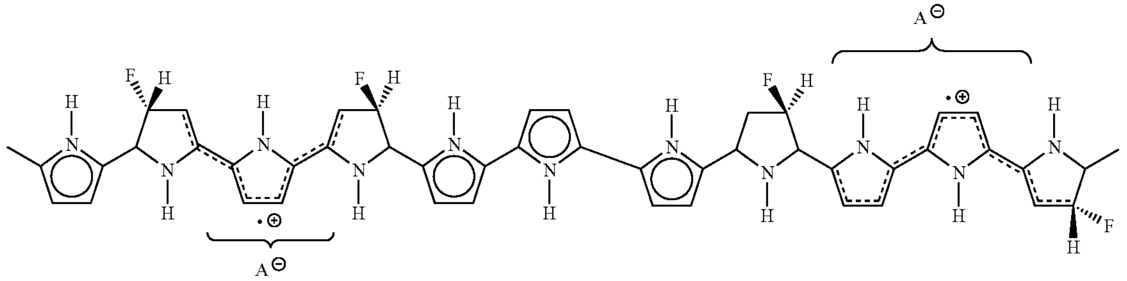

Thus, when the oxidation and reduction were repeated, the conjugate structure in the oxidized state was not maintained. As a result, it became difficult to carry out the oxidation and reduction, and the durability of the thin film was deteriorated.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An actuator comprising (i) a driving electrolytic solution containing an anion, wherein the electrolyte solution comprises water as a solvent, and the anion is a fluorine-containing ion derived from a strong acid and, (ii) an actuator element containing a conductive polymer doped with a dopant, the conductive polymer being expanded and contracted when electrically oxidized and reduced in the driving electrolytic solution, the dopant is an aromatic sulfonate ion free of fluorine, the conductive polymer contains a 5-membered heterocyclic moiety as a repeating unit, and at least part of the 5-membered heterocyclic moieties has a carbonyl group when the conductive polymer is in an oxidized state, wherein in the oxidized state, the conductive polymer is a polymer having the following structural formula (1):

(1)

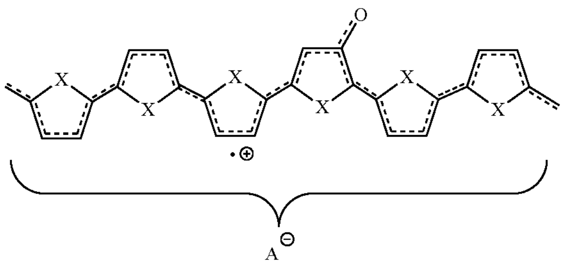

-continued

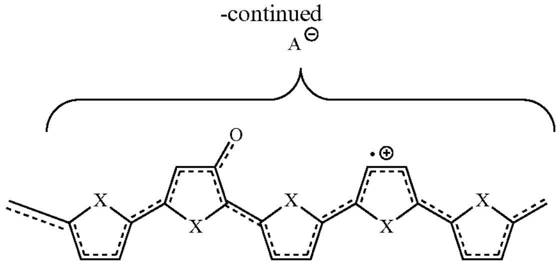

wherein each portion marked with a black circle (•) is a radical portion, each portion marked with a plus sign (+) is a positively-charged portion, each A is an anion, each portion marked with a minus sign (−) is a negatively-charged portion, and the dashed line represents that n electrons are delocalized in the conjugate structure.

2. An actuator according to claim 1, wherein X is NH, S, O, or Se.

3. An actuator according to claim 1, wherein the 5-membered heterocyclic moieties, represented as the repeating unit of the conductive polymer in the structural formula (1), have a substituent of an alkyl group or an oxyalkyl group.

4. An actuator according to claim 3, wherein X is NH, S, O, or Se.

5. An actuator according to claim 1, wherein the anion is one selected from the group consisting of a perfluoromethanesulfonylimide ion, a trifluoromethanesulfonate ion, a tetrafluoroborate ion, a hexafluorophosphate ion, a hexafluoroantimonate ion, and a hexafluoroarsenate ion.

6. An actuator according to claim 5, wherein the anion is a perfluoromethanesulfonylimide ion.

7. An actuator according to claim 1, wherein the anion is a perfluoromethanesulfonylimide ion, the dopant is a benzenesulfonate ion, a p-toluenesulfonate ion, a p-ethylbenzenesulfonate ion, or a m-xylenesulfonate ion, and the conductive polymer is a polymer containing a pyrrole moiety as a repeating unit or a derivative thereof.

8. An actuator according to claim 7, wherein the dopant is a benzenesulfonate ion or a p-toluenesulfonate ion.

9. An actuator according to claim 1, wherein the actuator has a total expansion/contraction ratio of 9% or more.

* * * * *